Oct. 28, 1969 P. KNORR 3,475,220

SECONDARY BATTERY

Filed June 22, 1967

INVENTOR.
PIETER KNORR
BY John R. Faulkner
Olin B. Johnson
ATTORNEYS

United States Patent Office 3,475,220
Patented Oct. 28, 1969

3,475,220
SECONDARY BATTERY
Pieter Knorr, Dearborn, Mich., assignor to Ford Motor Company, Dearborn, Mich., a corporation of Delaware
Filed June 22, 1967, Ser. No. 648,159
Int. Cl. H01m 43/00
U.S. Cl. 136—6                                    1 Claim

ABSTRACT OF THE DISCLOSURE

Secondary battery comprising plurality of cells in series connection, unit cell thereof comprising cell housing, which when closed, forms internal compartment with oppositely disposed wall surfraces electronically insulated from each other serving as anode and cathode, solid electrolyte between anode and cathode and dividing compartment, said cell housing comprising at least two housing components, at least one housing component comprising a tubular member and a plate-like conductor positioned within said tubular member dividing chamber formed by said tubular member into two oppositely opening cup-like compartments and serving as anode of one cell and cathode of adjacent.

BACKGROUND OF THE INVENTION

Secondary batteries have been developed which employ a molten alkali metal as the anodic reactant and a sulfur-comprising cathodic reactant that is electrochemically reversibly reactive with cations of the alkali metal. The cell or cells of these batteries are separated into an anodic reaction zone and a cathodic reaction zone by a crystalline, solid electrolyte that is selectively impermeable to other contents of these zones, e.g. the anodic reactant in elemental form, anions of the cathodic reactant, and the cathodic reactant in elemental or compound form.

This invention is concerned with method and means for assembling and operating a plurality of such cells in series electrical connection in a manner such that the internal electrical resistance of the battery attributable to inter-cell connection is minimized.

SUMMARY OF THE INVENTION

A plurality of alkali metal-sulfur cells of the type hereinbefore and hereinafter described can be assembled in series electrical connection. Such assembly is facilitated and made more efficient by the employment of an electrically-conductive tubular housing component which is essentially H-shaped in longitudinal cross section.

As aforementioned, the individual cells of these batteries employ a solid electrolyte as a half-cell separator between the anodic and cathodic reaction zones. In accordance with this invention, the aforementioned tubular housing component is positioned between the solid electrolytes of two adjacent cells. These plate-like, solid electrolytes and the oppositely-opening, cup-like compartments of this housing component form, with closing means, the anodic reaction zone of one cell and the cathodic reaction zone of another. In assembly, the plate-like conductor which divides the tubular conduit of this housing component into two compartments also serves as the anode of one cell and the cathode of the nearest adjacent cell. This permits the two cells to be in electrical connection while separated by a single metal thickness. This conductor can therefore be designed to have the minimum feasible thickness for the physical separation of reactants with resultant minimization of electrical resistance, e.g. as thin as 0.02–0.04 inch.

DESCRIPTION OF THE PREFERRED EMBODIMENT

Figure 2:
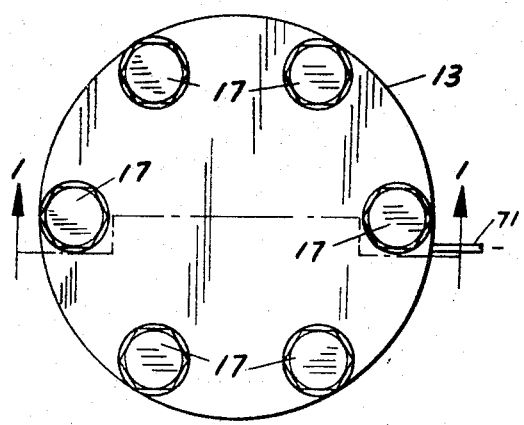
FIGURE 2 is a top view of the battery shown in FIGURE 1.

Referring now to the drawing, there is shown a battery 11 comprising three cells held in series electrical connection by a top plate 13, a bottom plate 15, bolts 17 and nuts 19.

The upper terminal cell is electrically insulated from top plate 13 by insulator 21, e.g. $Al_2O_3$. The upper cell is formed by terminal housing component 23, a connector-conductor 25, electrolyte plate 27, O-rings 29 and 31, and intermediate housing component 33. Electrolyte plate 27 divides the enclosure formed by housing components 23 and 33 into an anodic reaction zone 35 and a cathodic reaction zone 37.

The intermediate cell is formed by housing component 33, a connector-conductor 39, electrolyte plate 41, O-rings 43 and 45, and intermediate housing component 47. Electrolyte plate 41 divides the enclosure formed by the housing components 33 and 47 into an anodic reaction zone 49 and a cathodic reaction zone 51.

The lower cell is formed by housing component 47, a connector-conductor 53, electrolyte plate 55, O-rings 57 and 59, and terminal housing component 61. Electrolyte plate 55 divides the enclosure formed by housing component 47 and housing component 61 into an anodic reaction zone 63 and a cathodic reaction zone 65.

The aforementioned housing components are formed of one or more metals or alloys that are good electrical conductors, chemically resistant to the reactants and reaction products making contact therewith, and have a coefficient of expansion essentially equal to that of the ceramic half-cell separator hereinafter described, e.g. about $60 \times 10^{-7}$ unit change/unit length/° C. While a suitable metal carbide, nitride or phosphide or combination may be used, in this embodiment such components are formed from an iron-nickel alloy containing about 41% nickel. In another embodiment, the interior surfaces of such components are coated with aluminum. Suitable alloys for the manufacture of such components are well known in the art. See, for example, Low Expansion Alloys by M. A. Hunter, Metal Handbook, 8th edition, vol. 1, Properties and Selection of Metals, pp. 816–818, American Society of Metals, Metals Park, Ohio, 1961.

Plates 27, 41 and 55 are cationically-conductive, polycrystalline solid electrolytes which are essentially electronically nonconductive. These plates may be polycrystalline objects formed by sintering crystals consisting essentially of a structural lattice and sodium ions which are mobile in relation to such lattice under influence of an electric field. The structural lattice consists essentially of a major proportion by weight of ions of aluminum and oxygen and a minor proportion by weight of a metal having a valence not greater than 2 in crystal lattice combination, e.g. lithium or magnesium. In this embodiment, plate 13 is prepared in the following manner.

(1) In powdered form $Na_2CO_3$, $LiNO_3$, and $Al_2O_3$ were added to a vessel and mechanically mixed for 30 minutes. The $Al_2O_3$ employed was in the form of 0.05 micron particles (Linde B). The weight percent of the individual oxides employed were $Li_2O$—0.99, $Na_2O$—9.99 and $Al_2O_3$—89.02.

(2) The mix was heated at 1250° C. for one hour.

(3) The sample was mixed with a wax binder (Carbowax) and mechanically pressed into flat plates.

(4) The plates were then isostatically pressed at 90,000 p.s.i.

(5) The wax binder was removed by slowly heating the plates to about 550° C.

(6) The plates were sintered in an electric furnace at 1460° C. During sintering, the plates were kept in a covered crucible in the presence of packing powder of the same composition as said mix.

Closure of the cell housing is effected by sandwiching the solid electrolyte plates between the upper and lower metal housing components and with the aforementioned O-rings when pressure is exerted upon the assembly by turning the nuts 19 upon the bolts 17. In this embodiment, the O-rings are aluminium plated stainless steel. One may use other gasketing materials which are resistant to temperatures of about 300° C. or higher.

Figure 5:
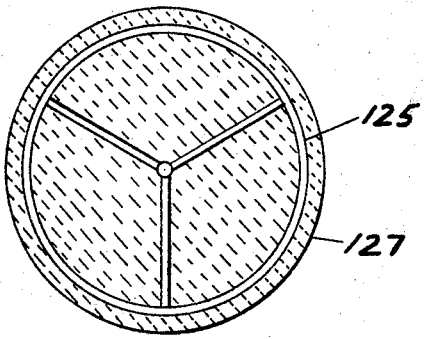
FIGURE 5 is a top view of the solid electrolyte of FIGURE 4 and a connector-conductor of more complex form than the corresponding conductor of FIGURE 4.
Figure 1:
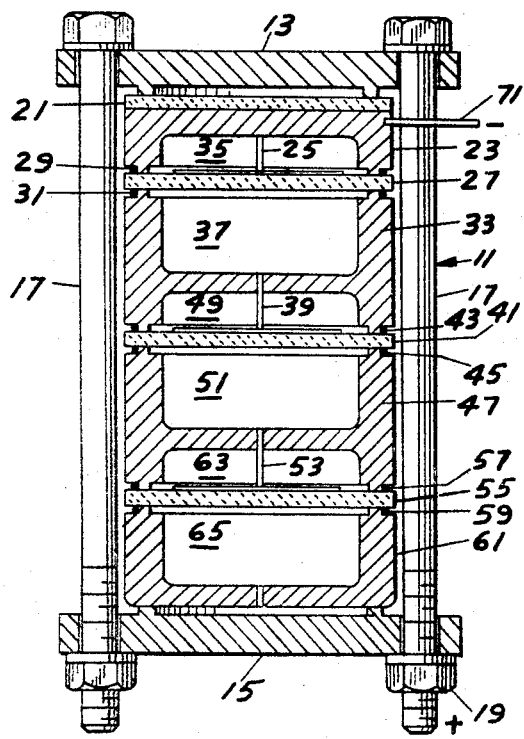
FIGURE 1 is a sectional view of one embodiment of the battery of this invention taken along line 1—1 of FIGURE 2.
Figure 4:
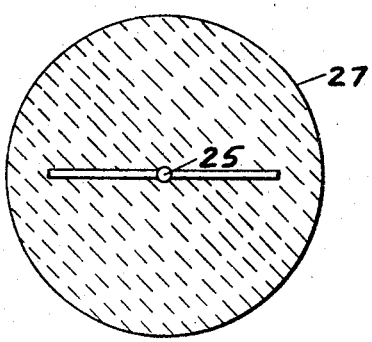
FIGURE 4 is a top view of a solid electrolyte of one of the cells of the battery of FIGURE 1 and the connector-conductor connecting the solid electrolyte and the nearest electrode.
Figure 3:
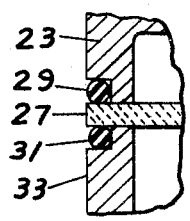
FIGURE 3 is an enlarged view of closing means utilized to seal cell housing components in the battery of FIGURE 1.

In this embodiment, anodic reaction zones 35, 51 and 63 contain molten sodium. Connector-conductors 25, 39 and 53 provide electrical connection between the solid electrolyte and the anode of their respective cells which is supplementary to that provided by contact of the molten alkali metal anodic reactant with the anode. A connector-conductor 125 providing greater area of contact with an electrolyte plate 127 is shown in FIGURE 5.

The cathodic reaction zones 37, 51 and 65 contain a sulfur-comprising reactant. In this embodiment, these zones are initially charged with $Na_2S_5$. However, if suitable conduction means are provided in such zones to initiate the discharge cycle, the cathodic reactant may consist essentially of sulfur. Thus, in addition to the sulfur reactant, such zones may contain finely divided carbon particles, carbonized felt or cloth, porous carbon feeder plates, etc. The porous carbon feeder plates may also be used advantageously in the anodic reaction zone.

The reactants may be cast into blocks of suitable size and shape for assembly and subsequently heated to operating temperature, e.g. 250° C. or higher. A sufficient quantity of each of the reactants is employed to maintain the reactant in contact with the solid electrolyte and in electrical connection with the respective electrode.

When an aluminum lining is employed for the cathodic reaction zone, it is advantageous to employ a contact conductor of other suitable metal or alloy at one or more locations on the surface of the housing wall to facilitate electrical connection between the cathodic reactant and the housing electrode. This may take the form of a ring, grid, etc. Chromel has been advantageously employed for this conductor.

In theembodiment here shown, the upper plate 13, the lower plate 15, and the bolts 17 are in electrical connection with each other and with the housing component 61 which serves as the cathode of the lower cell. Any of such parts can be employed as the positive lead from the battery. Conductor 71 in electrical connection with housing component 23 provides the negative lead.

The cells, when assembled as shown and described, are prepared for initiation of the discharge half cycle of the battery. In the discharge half cycle, the alkali metal anodic reactant, e.g. molten sodium, releases electrons to the anode and thence to the external circuit with resultant formation of cations in the anodic reaction zone. Sulfur atoms in the cathodic reaction zone accept electrons from the cathode and external circuit and form anions. The positively charged alkali metal ions are attracted to the cathodic reaction zone and pass through the cationically-conductive solid electrolyte to associate with the negatively charged sulfur ions. In the charging half cycle, the current flow is reversed by applying an extraneous source of electrical energy and the alkali metal ions are driven back through the solid electrolyte into the anodic reaction zone.

It is to be understood that this invention is not limited to the embodiments herein shown and described but that changes and modifications may be made within the spirit and scope of the invention as defined in the appended claim.

What is claimed is:

1. An electrically-rechargeable, secondary battery comprising a plurality of cells in series electrical connection, a unit cell of said battery comprising a closable cell housing which when closed forms an internal compartment and has oppositely disposed, electronically-conductive, wall surfaces electronically insulated from each other which respectively serve as anode and cathode of the cell, an electronically-insulative, cationically-conductive, solid electrolyte interposed between said anode and said cathode, dividing said compartment into an anodic reaction zone and a cathodic reaction zone, and separating the anodic half-cell reactions of said anodic reaction zone from the cathodic half-cell reactions of said cathodic reaction zone, an alkali metal within said anodic reaction zone in contact with said solid electrolyte and in electrical connection with said anode, and within said cathodic reaction zone in contact with said solid electrolyte and in electrical connection with said cathode, a sulfur-comprising cathodic reactant that is electrochemically reversibly reactive with ions of said alkali metal, said cell housing comprising, exclusive of closing means, at least two housing components, at least one of said housing components comprising a tubular member and a plate-like conductor positioned within said tubular member intermediate the ends thereof dividing the chamber formed by said tubular member into two oppositely opening cup-like compartments and serving as the anode of one of said cells and as the cathode of the nearest adjacent cell.

References Cited

UNITED STATES PATENTS 3,413,150  11/1968  Kummer et al.

WINSTON A. DOUGLAS, Primary Examiner

A. SKAPARS, Assistant Examiner